United States Patent

Angeleri et al.

[15] 3,659,046

[45] Apr. 25, 1972

[54] MESSAGE SCRAMBLER FOR PCM COMMUNICATION SYSTEM

[72] Inventors: Emanuele Angeleri; Evangelo Lyghounis, both of Milan, Italy

[73] Assignee: Societa' Italiana Telecomunicazioni Siemens S.p.A., Piazzale Zavattari, Milan, Italy

[22] Filed: May 13, 1969

[21] Appl. No.: 824,235

[30] Foreign Application Priority Data

May 15, 1968 Italy ................................16,492 A/68

[52] U.S. Cl. ...............................................................178/22
[51] Int. Cl. ...........................................................H04l 9/00
[58] Field of Search ................................178/22; 325/32, 34

[56] References Cited

UNITED STATES PATENTS 3,427,399 2/1969 Ehrat.......................................178/22

*Primary Examiner*—Malcolm F. Hubler
*Attorney*—Karl F. Ross

[57] ABSTRACT

A message to be transmitted in binary form over a signal channel to a remote terminal is scrambled by being passed through an Exclusive-OR gate which logically combines its bits in pseudo-random fashion with bits of a quasi-aperiodic code sequence to generate a scrambled binary message; a similar Exclusive-OR gate at the receiving terminal logically combines the bits of that scrambled message with corresponding bits from a like quasi-periodic code sequence to reproduce the original message. The circuits delivering the two code sequences are concurrently reset, at irregular intervals, by a predetermined succession of code combinations transmitted over the channel.

6 Claims, 2 Drawing Figures

Figure 1:
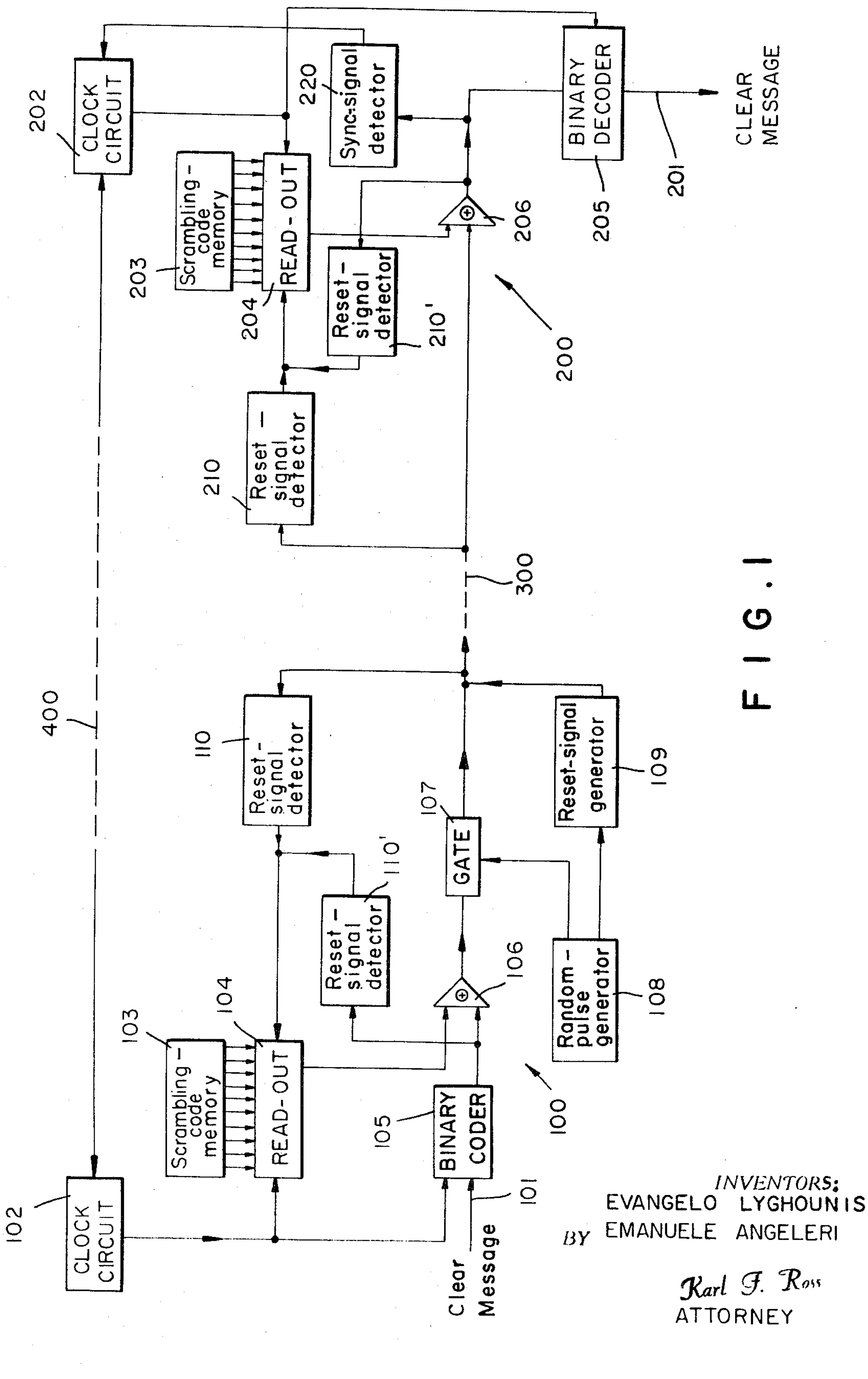

INVENTORS:
EVANGELO LYGHOUNIS
BY EMANUELE ANGELERI

Karl F. Ross
ATTORNEY

INVENTORS:
EVANGELO LYGHOUNIS
EMANUELE ANGELERI
BY Karl F. Ross
ATTORNEY

MESSAGE SCRAMBLER FOR PCM COMMUNICATION SYSTEM

Our present invention relates to a system for the transmission of scrambled messages in binary-code form.

The transmission of secret messages by a pulse-code-modulation (PCM) system generally requires precise synchronization between the two communicating stations; this is conventionally accomplished with the aid of special code signals of fixed cadence. Owing to their regular recurrence, such synchronizing signals are relatively easily identified and, apart from furnishing a clue to an interceptor, also facilitate jamming of the transmission since a blanking of these signals is sufficient to prevent decoding at the receiving station.

It is, therefore, an important object of our present invention to provide a communication system of the general type described which is virtually immune from interception and jamming and which therefore insures maximum privacy in the transmission of coded messages.

Another object of our invention is to provide means in such communication system for instantly scrambling and unscrambling the individual bits of the message in the rhythm of their arrival at the transmitting and the receiving terminal, respectively.

We have found, in accordance with the present invention, that these objects can be realized most effectively with the aid of a quasi-aperiodic series of scrambling codes generated by a pseudo-random sequencer, these scrambling codes being logically combined with the outgoing message codes at the transmission station to form a train of unintelligible binary signals. At the receiving station a similar sequencer generates an identical series of scrambling codes which, again by logical combination, extracts from the incoming signal train the clear message to be communicated.

For the sake of simplicity, we shall consider hereinafter only the transmission of one train of code pulses (or bits) over a single channel, it being understood that the same principles can be applied to pulse combinations transmitted in parallel over a plurality of channels.

The synchronization of the two sequencers at the transmitting and receiving stations is maintained, in a manner known per se, by respective clock circuits locked in step with each other. From time to time, preferably at random intervals, a reset signal is transmitted which automatically restarts both sequencers to help maintain their synchronization or to restore them to operation in unison if they should have fallen out of step. The resetting intervals should be short enough to prevent any prolonged desynchronization which would seriously mutilate the transmitted message; they should, however, be of sufficient duration to avoid ready recognition of the bit or code combinations involved, such recognition being made even more difficult by the irregular recurrence of these signals.

The logical functions suitable for scrambling and unscrambling of the massage must satisfy the following requirements:

Since each message bit as well as each scrambling bit can have either of two possible states (0 or 1), there are four possible combinations which must include two 0's and two 1's. This symmetry is essential in order to prevent ambiguity in the subsequent retranslation with the aid of the same scrambling codes. Moreover, the logical function employed must not invariably lead to either a replica or an inversion of one of the two original bits, i.e. the message bit or the scrambling bit.

Two logical functions satisfying these requirements are the EXCLUSIVE-OR function $C = A\bar{B} + \bar{A}B$ and the LOGICAL EQUIVALENCE function $C = AB + \bar{A}\bar{B}$.

The truth tables of these two functions are given below:

EXCLUSIVE OR

| A | B | C |
|---|---|---|
| 0 | 0 | 0 |
| 0 | 1 | 1 |
| 1 | 0 | 1 |
| 1 | 1 | 0 |

LOGICAL EQUIVALENCE

| A | B | C |
|---|---|---|
| 0 | 0 | 1 |
| 0 | 1 | 0 |
| 1 | 0 | 0 |
| 1 | 1 | 1 |

In each of these cases, A can be derived from the same logical combination of B and C.

The scrambling code may also be considered as the pseudo-random binary addition of either 0 or 1 to the original message bit, with $0+0=0$, $0+1=1$, $1+0=1$ and $1+1=0$.

Figure 2:
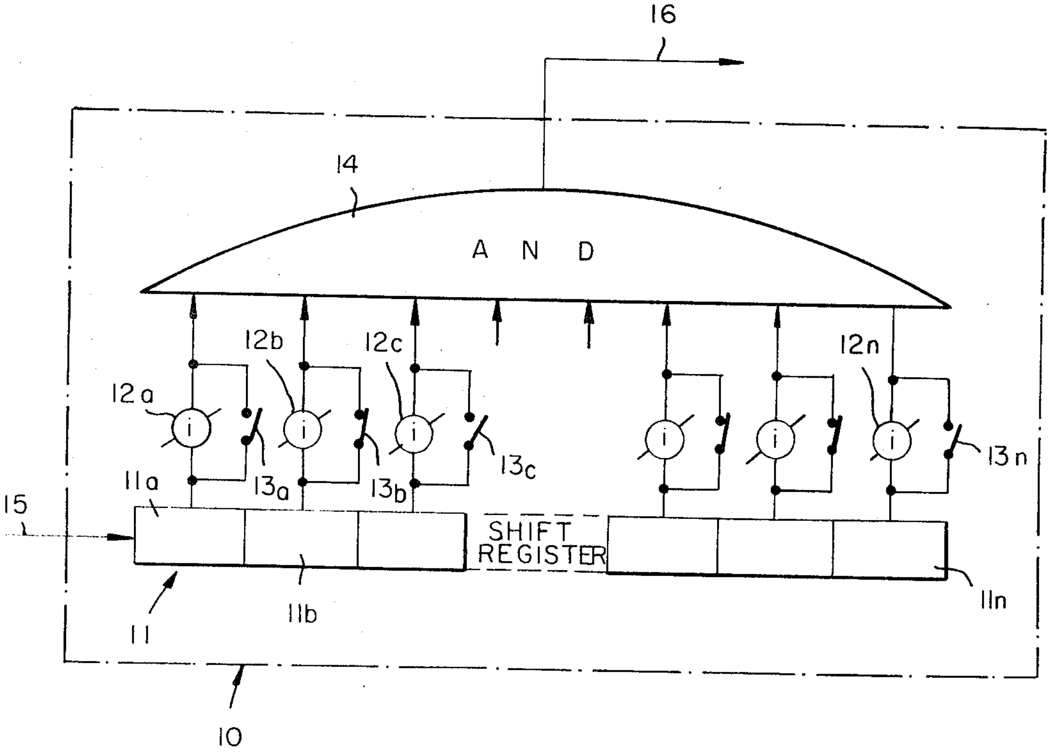

The invention will be described in greater detail with reference to the accompanying drawing in which:

FIG. 1 is a block diagram illustrating an overall communication system embodying our invention; and FIG. 2 is a more detailed circuit diagram of an element of the system of FIG. 1.

In FIG. 1 we have illustrated a signaling channel 300 adapted for PCM-type communication between a transmitting terminal 100 and a receiving terminal 200. Transmitting station 100 comprises an input line 101 over which a clear message, e.g. in the form of a modulated carrier wave, is fed to a binary coder 105 translating the instantaneous values of the message signal into binary code combinations to be transmitted over channel 300. While this channel will usually consist of several parallel transmission paths, it will suffice for purposes of the present description to consider it as a single conductor carrying a train of consecutive bits.

Coder 105 is stepped by a clock circuit 102 which also controls a read-out network 104 associated with a scrambling-code memory 103 storing a pseudo-random sequence of code combinations. This memory may be, for example, a feedback shift register of the type described by P.E.K. Chow and by A.C. Davies in the Apr. 1964 issue of *Electronic Engineering* under the title "The Synthesis of Cyclic Code Generators," PP. 253*ff.*

A similar memory 203 at receiving station 200 Works into a read-out network 202 which is controlled by a clock circuit 202 synchronized with clock circuit 102 by a channel diagrammatically indicated at 400.

Network 104 and coder 105 work into respective inputs of an Exclusive-OR gate 106 which delivers the circle sum of the bits on these inputs to the channel 300 by way of a normally open gate 107. A random-pulse generator 108 operates at irregular intervals to trigger a reset-signal generator 109 while concurrently blocking the gate 107, the output of generator 109 being thus substituted during a short period for the scrambled message signals. The signals appearing, in binary form, on channel 300 are transmitted to the remote terminal 200 and are also picked up by a reset-signal detector 110 controlling the read-out network 104. A signal detector 210 picks up the same signals at station 200 to control the read-out network 204 of memory 203; the scrambled signals are also fed to an input of an Exclusive-OR gate 206 which receives on its other input the pulse sequence generated by network 204. Gate 206 works into a binary decoder 205 which, under the control of clock circuit 202, produces a substantial replica of the original clear message on an outgoing line 201.

The system so far described operates as follows:

The appearance of a message bit in the output of coder 105 coincides with the generation of a scrambling bit by the sequencer 103, 104, the two bits being logically combined in gate 106 to form part of the scrambled binary message transmitted over channel 300. The bits delivered to gate 106 from network 104 vary in a virtually unpredictable manner even though the cycle of the sequencer 103, 104 is of finite length. At some point within that cycle (or possibly after a recurrence thereof), pulse generator 108 goes into action and causes the delivery of a reset signal from generator 109 to channel 300. This reset signal is sensed virtually simultaneously by the two detectors 110 and 210 which thereupon switch the respective read-out networks 104, 204 to restart the corresponding sequencers. Thus, the two sequencers will generally operate exactly in step with each other whereby any scrambled bit arriving at gate 206 is accompanied by the proper unscrambling bit from sequencer 203, 204 to restore the original message bit in the output of that gate.

Thus, the resetting signals may be spaced apart by widely varying time intervals so that an interceptor searching for a periodically recurring synchronizing signal will not be able to trace them. Even greater confusion for the interceptor can be created if additional reset signals are interspersed, again at irregular intervals, with the signals from generator 109, these additional signals being part of the original message fed into coder 105 so as to appear on channel 300 in scrambled form. A second detector 110' for these additional reset signals is connected to the channel 300 ahead of Exclusive-OR gate 106, working into read-out network 104 in parallel with detector 110; in an analogous manner, another detector 210' receives the output of Exclusive-OR gate 206 to reset the read-out network 204, being connected thereto in parallel with detector 210.

Also shown in FIG. 1 is a detector 220 responsive to a periodic synchronization signal, e.g. a single code combination, which may form part of the transmitted message but which will escape detection by an interceptor since it appears in various disguises, owing to the operation of scrambling sequencer 103, 104, while traveling between stations 100 and 200. This sync signal can be used to lock the clock circuit 202 precisely in step with clock circuit 102; reference in this connection may be made to an article published in the annals of the XVth International Electronic Congress, Rome 1968, under the title "Note sul progetto di un Multiplex telefonico PCM facente largo impiego di circuiti integrati" (Casoria-Colantoni-Fortuna), and to an article by R.F. Pintou in A.T.E. Journal Vol. 20, No. 1, under the title "Experimental 24-Channel PCM system for Junction Circuits."

In FIG. 2 we have illustrated, by way of example, a reset-signal detector 10 representative of any of the detectors 110, 110', 210, 210' of FIG. 1. This detector comprises a shift register 11 with *n* stages 11*a*, 11*b*, . . . 11*n* working into a common AND gate 14 via respective inverters 12*a*, 12*b*, . . . 12*n* which can be selectively short-circuited by associated bypass switches 13*a*, 13*b*, . . . 13*n*. A bit arriving via an input lead 15 at the first register stage 11*a* is shifted during the next clock cycle to stage 11*b* while a new bit enters the stage 11*a*, and so on, whereby any series combination of *n* bits is concurrently stored in the register 11 during one clock cycle. If this combination corresponds to the pattern of inversion as determined by the selective closure switches 13*a*, 13*b*, etc., i.e. if every "0" bit in the combination confronts an open switch whereas every "1" bit confronts a closed switch, coincidence gate 14 conducts to transmit a reset signal via an output lead 16 to the associated read-out network 104 or 204. It will be understood that each stage of the shift register simultaneously stores as many bits as there are parallel transmission paths, and that an individual AND gate 14 is provided for each path, this being also true of the Exclusive-OR gates 106 and 206.

Naturally, the message fed in at line 101 of FIG. 1 may already be precoded so as to require further decoding upon reemerging on output line 201.

The following example illustrates the scrambling and unscrambling of the bits of an original message with the aid of a pair of Exclusive-OR gates as shown in FIG. 1:

| | | | | | | | | |
|---|---|---|---|---|---|---|---|---|
| Original message | 1 | 1 | 0 | 1 | 0 | 1 | 1 | 0 |
| Scrambling sequence | 1 | 0 | 1 | 0 | 0 | 0 | 1 | 0 |
| Scrambled message | 0 | 1 | 1 | 1 | 0 | 1 | 0 | 0 |
| Unscrambling sequence | 1 | 0 | 1 | 0 | 0 | 0 | 1 | 0 |
| Reproduced message | 1 | 1 | 0 | 1 | 0 | 1 | 1 | 0 |

If the EXCLUSIVE-OR function were replaced by the LOGICAL EQUIVALENCE function referred to above, the bits in the second and fourth lines of the foregoing table would have to be inverted. Thus, the latter function can be performed in the system of FIG. 1 by inserting an inverter in the output of each gate 106, 206. For the maintenance of the secrecy the two functions may be considered equivalent.

We claim:

1. A system for transmitting a coded message from a first station to a second station over a channel adapted to carry binary code pulses, comprising:

coding means at said first station for producing at least one train of consecutive code pulses representing successive bits of an original message to be transmitted;

first sequencing means at said first station for generating a series of scrambling bits following one another in the rhythm of the message bits produced by said coding means;

first logical circuitry at said first station connected to said coding means and to said first sequencing means for concurrently receiving message and scrambling bits therefrom and for converting the combinations thereof into a succession of scrambled bits for transmission over said channel, said scrambled bits being unambiguously related to respective combinations of message and scrambling bits;

second sequencing means at said second station for generating a series of unscrambling bits identical with said series of scrambling bits and following one another in the rhythm of the scrambled bits received over said channel;

second logical circuitry at said second station connected to said channel and to said second sequencing means for concurrently receiving therefrom scrambled and unscrambling bits and for deriving therefrom a succession of message bits corresponding to those produced by said coding means;

decoding means at said second station for reconverting the output of said second logical circuitry into a substantial replica of said original message;

a source of reset signals at said first station intermittently operable to generate a predetermined code combination for transmission over said channel;

first detector means at said first station connected to said channel for sensing said code combination and for actuating said first sequencing means to restart said series of scrambling bits in response thereto; and second detector means at said second station connected to said channel for sensing said code combination and for actuating said second sequencing means to restart said series of unscrambling bits in response thereto.

2. A system as defined in claim 1 wherein said source comprises a code-pulse generator operative at irregular intervals.

3. A system as defined in claim 1 wherein said first and second detector means are connected to said channel between said first and second logical circuitry, said source being connected to said channel in the output of said first logical circuitry.

4. A system as defined in claim 1 wherein said first and second detector means each comprises a shift register with a multiplicity of stages, coincidence-gate means connected to all said stages and inverter means selectively insertable between said stages and said coincidence-gate means.

5. A system as defined in claim 1, further comprising first clock means at said first station for timing the operation of said coding means and of said first sequencing means, second clock means at said second station for timing the operation of said decoding means and of said second sequencing means, and synchronizing means for locking said first and second clock means in step with each other.

6. A system as defined in claim 5 wherein said synchronizing means includes code-sensing means connected to said channel at said second station beyond said second logical circuitry for picking up a recurring synchronizing signal from the replica of said original message.

* * * * *